US011524406B2

(12) United States Patent
Huang et al.

(10) Patent No.: US 11,524,406 B2
(45) Date of Patent: Dec. 13, 2022

(54) CALIBRATION METHOD AND DEVICE FOR ROBOTIC ARM SYSTEM

(71) Applicant: Industrial Technology Research Institute, Hsinchu (TW)

(72) Inventors: Jay Huang, Tainan (TW); Yu-Chun Cheng, Kaohsiung (TW); Hian-Kun Tenn, Tainan (TW); Tsai-Ling Kao, Tainan (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 632 days.

(21) Appl. No.: 16/516,694

(22) Filed: Jul. 19, 2019

(65) Prior Publication Data

US 2020/0156251 A1 May 21, 2020

(30) Foreign Application Priority Data

Nov. 20, 2018 (TW) .................................. 107141139

(51) Int. Cl.
*B25J 9/16* (2006.01)
*G06T 7/73* (2017.01)
*G06T 7/50* (2017.01)

(52) U.S. Cl.
CPC ........... *B25J 9/1692* (2013.01); *B25J 9/1697* (2013.01); *G06T 7/50* (2017.01); *G06T 7/73* (2017.01);
(Continued)

(58) Field of Classification Search
CPC . B25J 9/1692; B25J 9/1697; B25J 9/00; B25J 13/08; B25J 19/04; G06T 7/50;
(Continued)

(56) References Cited

U.S. PATENT DOCUMENTS 4,925,308 A 5/1990 Stern et al.
8,553,942 B2 * 10/2013 Lynch ..................... G01C 3/00
382/106
(Continued)

FOREIGN PATENT DOCUMENTS

CN 102452081 A 5/2012
CN 102922521 A 2/2013
(Continued)

OTHER PUBLICATIONS

FR-2987685-A1 Translation (Year: 2013).*
(Continued)

*Primary Examiner* — Dale Moyer (57) ABSTRACT

A calibration method for a robotic arm system is provided. The method includes: capturing an image of a calibration object fixed to a front end of the robotic arm by a visual device, wherein a pedestal of the robotic arm has a pedestal coordinate system, and the front end of the robotic arm has a first relative relationship with the pedestal, the front end of the robotic arm has a second relative relationship with the calibration object; receiving the image and obtaining three-dimensional feature data of the calibration object according to the image by a computing device; and computing a third relative relationship between the visual device and the pedestal according to the three-dimensional feature data, the first relative relationship, and the second relative relationship to calibrate a position error between a physical location of the calibration object and a predictive positioning-location generated by the visual device.

12 Claims, 8 Drawing Sheets

(52) U.S. Cl.
CPC ............... *G06T 2207/10028* (2013.01); *G06T 2207/20021* (2013.01); *G06T 2207/30244* (2013.01)

(58) Field of Classification Search
CPC ............ G06T 7/73; G06T 2207/10028; G06T 2207/20021; G06T 2207/30244; G05B 2219/37567; G05B 2219/39008; G05B 2219/40594
See application file for complete search history.

(56) References Cited

U.S. PATENT DOCUMENTS

| | | | |
|---|---|---|---|
| 9,188,973 | B2 | 11/2015 | Tenney et al. |
| 2005/0068523 | A1 | 3/2005 | Wang et al. |
| 2008/0188983 | A1 | 8/2008 | Ban et al. |
| 2008/0294364 | A1 | 11/2008 | Nara et al. |
| 2015/0206023 | A1* | 7/2015 | Kochi ............... G01B 11/00 382/199 |
| 2016/0039096 | A1* | 2/2016 | Wallack ............... G06T 7/80 901/9 |
| 2018/0186004 | A1 | 7/2018 | Park et al. |

FOREIGN PATENT DOCUMENTS

| | | |
|---|---|---|
| CN | 103706571 A | 4/2014 |
| CN | 103761747 A | 4/2014 |
| CN | 105073348 A | 11/2015 |
| CN | 105965495 A | 9/2016 |
| CN | 106182001 A | 12/2016 |
| CN | 103209809 B | 2/2017 |
| CN | 106817905 A | 6/2017 |
| CN | 107689061 A | 2/2018 |
| CN | 107756391 A | 3/2018 |
| CN | 108297096 A | 7/2018 |
| EP | 1434169 A3 | 7/2005 |
| EP | 3329877 A1 | 6/2018 |
| FR | 2987685 A1 * | 9/2013 ......... G06K 9/00201 |
| JP | 2016059982 A | 4/2016 |
| JP | 2018144165 A | 9/2018 |
| TW | I614103 B | 2/2018 |
| TW | 201815533 A | 5/2018 |
| WO | WO2014161603 A1 | 10/2014 |
| WO | WO2016047807 A1 | 3/2016 |

OTHER PUBLICATIONS

China Patent Office, Office Action, Patent Application Serial No. 201811530966.0, dated Feb. 19, 2021, China.
James L. Crowley et al., "Dynamic Calibration of an Active Stereo Head," 1993, 6 pages, ICCV, US.
Forbes et al., "An Inexpensive, Automatic and Accurate Camera Calibration Method," 2002, 6 pages, the Thirteenth Annual South African Workshop on Pattern Recognition PRASA, US.
Grossmann et al., "Continuous hand-eye calibration using 3D points," 2017, 8 pages, IEEE, US.

* cited by examiner

CALIBRATION METHOD AND DEVICE FOR ROBOTIC ARM SYSTEM

TECHNICAL FIELD

This application claims priority from Taiwan Patent Application No. 107141139, filed on Nov. 20, 2018, the disclosure of which is incorporated herein by reference in its entirety.

TECHNICAL FIELD

The present disclosure generally relates to a calibration method and a calibration device. More specifically, aspects of the present disclosure relate to a calibration method and a calibration device for a robotic arm system.

BACKGROUND

Along with the rapid advances being made in the technologies employed in industrial production, visual devices are used in automated factories to position work pieces and guide robotic arms so that a work piece can be automatically grabbed and released with high precision. This increases the efficiency of high-precision, rapid production. The most essential factor affecting the automatic and precise motion of a robotic arm lies in the visual device, which is used to help guide the robotic arm. Therefore, how to use a visual device to calibrate a robotic arm and reduce guiding error has become an important issue with respect to robotic arms.

A noted problem of using the visual device to measure a work piece's pose is the complicated and inconvenient calibration process in which the visual device typically measures the work piece's pose with respect to the visual device's coordinate system, whereas the robotic arm moves the front end effector with respect to the robotic arm's coordinate system. As used herein, the term "pose" illustratively refers to a combination of three dimensional position and three dimensional rotation. Thus, the work piece's pose computed by the visual device must be translated into the robotic arm's coordinate system in order for the robotic arm to make use of the work piece's pose as computed by the visual device.

For conventional calibration methods, however, to achieve high accuracy of the relative poses between the coordinate system of the visual device and the coordinate system of the robotic arm, it is necessary to acquire multiple images of the calibration plate or object with various poses following specific manner. Therefore, the calibration processes are time consuming and the results are sensitive to the calibrating process, which makes the calibration mission rely on operator's experience and be difficult to be integrated into automation systems. Thus, a calibration method and a calibration device for a robotic arm system are provided in the disclosure to improve the calibration efficiency and improve the calibration accuracy.

SUMMARY

The following summary is illustrative only and is not intended to be limiting in any way. That is, the following summary is provided to introduce concepts, highlights, benefits and advantages of the novel and non-obvious techniques described herein. Select, not all, implementations are described further in the detailed description below. Thus, the following summary is not intended to identify essential features of the claimed subject matter, nor is it intended for use in determining the scope of the claimed subject matter.

Accordingly, a calibration method and a calibration device for a robotic arm system are provided in the disclosure to improve the disadvantages.

In an embodiment, a calibration method for a robotic arm system is provided in the disclosure. The robotic arm system comprises a robotic arm, a calibration object, a visual device and a computing device. The method comprises: capturing, by the visual device, an image of the calibration object fixed to a front end of the robotic arm, wherein a pedestal of the robotic arm has a pedestal coordinate system, and the front end of the robotic arm has a first relative relationship with the pedestal, the front end of the robotic arm has a second relative relationship with the calibration object; receiving, by the computing device, the image, and obtaining three-dimensional feature data of the calibration object according to the image; and computing, by the computing device, a third relative relationship between the visual device and the pedestal of the robotic arm according to the three-dimensional feature data, the first relative relationship, and the second relative relationship to calibrate a position error between a physical location of the calibration object and a predictive positioning-location generated by the visual device.

In an embodiment, a robotic arm system is provided in the disclosure. The robotic arm system comprises a calibration object, a robotic arm, a visual device and a computing device, wherein the calibration object is fixed to a front end of the robotic arm. The visual device captures an image of the calibration object. The computing device is coupled to the robotic arm and the visual device. A pedestal of the robotic arm has a pedestal coordinate system, and the front end of the robotic arm has a first relative relationship with the pedestal, the front end of the robotic arm has a second relative relationship with the calibration object. The computing device receives the image from the visual device and obtains three-dimensional feature data of the calibration object according to the image. The computing device computes a third relative relationship between the visual device and the pedestal of the robotic arm according to the three-dimensional feature data, the first relative relationship, and the second relative relationship to calibrate a position error between a physical location of the calibration object and a predictive positioning-location generated by the visual device.

In an embodiment, a calibration method for a robotic arm system is provided. The calibration method is used in a computing device. The method comprises: receiving an image of the calibration object fixed to a front end of the robotic arm from the visual device, wherein a pedestal of the robotic arm has a pedestal coordinate system, and the front end of the robotic arm has a first relative relationship with the pedestal, the front end of the robotic arm has a second relative relationship with the calibration object; obtaining three-dimensional feature data of the calibration object according to the image; and computing a third relative relationship between the visual device and the pedestal of the robotic arm according to the three-dimensional feature data, the first relative relationship, and the second relative relationship to calibrate a position error between a physical location of the calibration object and a predictive positioning-location generated by the visual device.

BRIEF DESCRIPTION OF DRAWINGS

The accompanying drawings are included to provide a further understanding of the disclosure, and are incorporated in and constitute a part of the present disclosure. The drawings illustrate implementations of the disclosure and, together with the description, serve to explain the principles of the disclosure. It should be appreciated that the drawings are not necessarily to scale as some components may be shown out of proportion to the size in actual implementation in order to clearly illustrate the concept of the present disclosure.

DETAILED DESCRIPTION

Various aspects of the disclosure are described more fully below with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

The word "exemplary" is used herein to mean "serving as an example, instance, or illustration." Any aspect described herein as "exemplary" is not necessarily to be construed as preferred or advantageous over other aspects. Furthermore, like numerals refer to like elements throughout the several views, and the articles "a" and "the" includes plural references, unless otherwise specified in the description.

It should be understood that when an element is referred to as being "connected" or "coupled" to another element, it may be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion. (e.g., "between" versus "directly between", "adjacent" versus "directly adjacent", etc.).

Illustratively, a front end of a robotic arm is a controllable machine that is capable of grasping and releasing work pieces and may comprise, e.g., mechanical grippers, vacuum suction, electromagnetic contacts, etc. Generally, as used herein, the combination of a front end and a pedestal is termed a robotic arm. The three dimensional area that is accessible by the robotic arm for performing operations is termed a workplace for the robotic arm.

Figure 1:
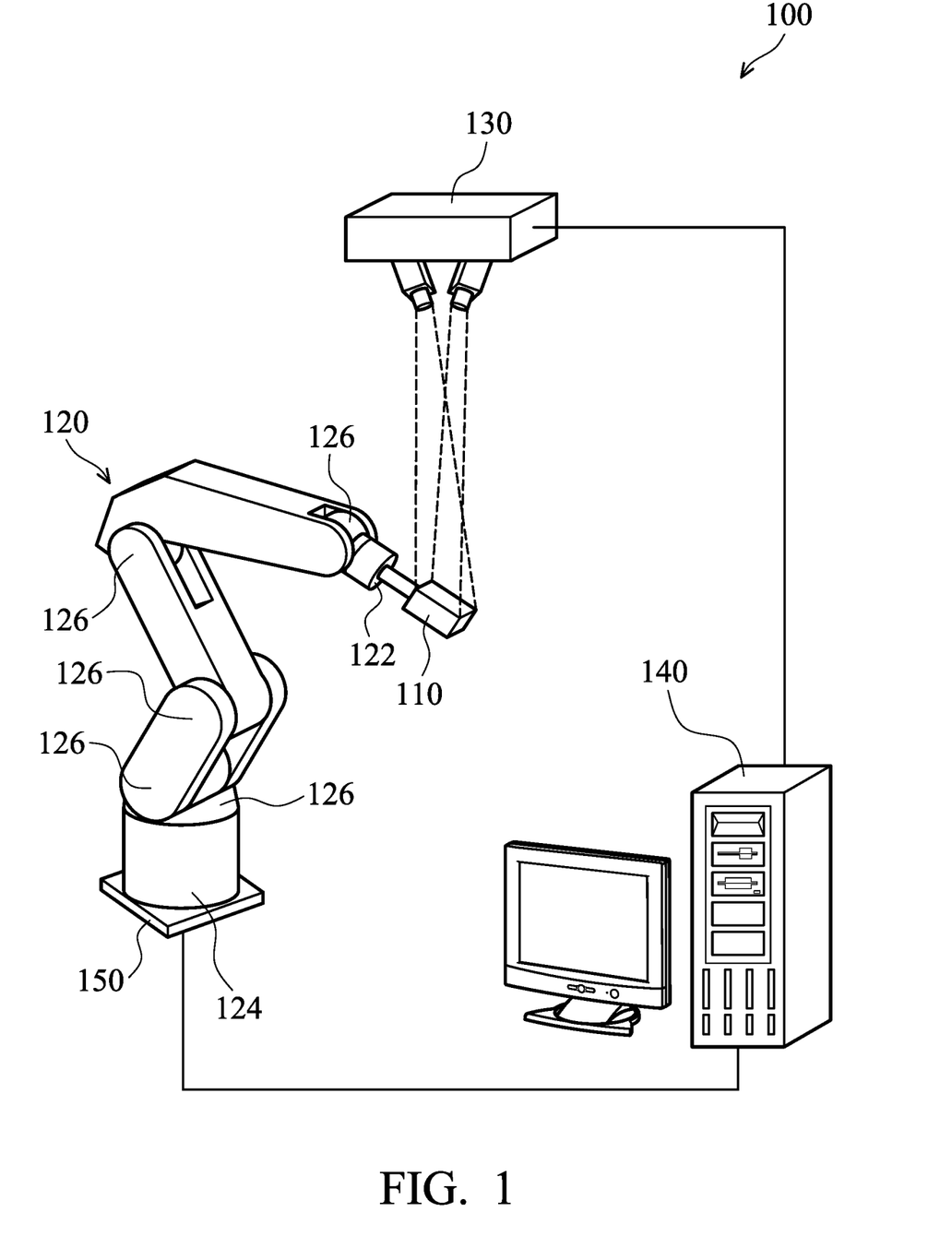
FIG. 1 shows a schematic diagram of a robotic arm system according to one embodiment of the present disclosure.

FIG. 1 shows a schematic diagram of a robotic arm system 100 according to one embodiment of the present disclosure. In FIG. 1, the robotic arm system 100 comprises a robotic arm 120, a visual device 130, and a computing device 140. The robotic arm 120 comprises a front end 122, an end 124 and a plurality of joints 126. The end 124 is disposed above a pedestal 150. The front end 122 may be equipped with some components such as a laser head, a dispenser, a welding head, a cutting head, gripping head and the like as the user desires. In this embodiment, a calibration object 110 is fixed to the front end 122 of the robotic arm 120, wherein the calibration object 110 is a three-dimensional object that does not have any positioning marks. The joints 126 allow the robotic arm 120 to rotate and join two arms of the robotic arm 120. In accordance with different applications, there may be a different number of joints and arms, but the scope of the present disclosure is not limited to this embodiment. The pedestal 150 may be a rotatable pedestal or a fixed pedestal.

The visual device 130 captures an image of the workspace of the robotic arm 120, wherein each image data comprises a 2D pixel array and a depth value for each pixel, and the depth value corresponds to the distance to the visual device 130 of the point imaged by that pixel. Since the vertical and horizontal positions of the pixels in the 2D pixel array themselves correspond to zenith and azimuth angles of the points they represent with respect to the TOF 3D camera 3, each image can be illustrated by a three-dimensional point cloud corresponding to visible points of the object in range of the visual device 130. In an embodiment, the visual device 130 can be any depth camera or device that can capture depth images.

The computing device 140 can be connected to the robotic arm 120 and the visual device 130 in a wired or wireless manner, and comprises a processor and a memory that can store the program for controlling the motion of the robotic arm 120 and controlling and receiving the image captured by the visual device 130. The types of the computing device 140 range from small handheld devices, such as mobile telephones and handheld computer to large mainframe systems, such as mainframe computers. Examples of handheld computers include personal digital assistants (PDAs), notebooks, and the like.

It should be understood that the computing device 140 shown in FIG. 1 is an example of one suitable robotic arm system 100 architecture. Each of the components shown in FIG. 1 may be implemented via any type of computing device, such as the computing device 700 described with reference to FIG. 7, for example.

Figure 2:
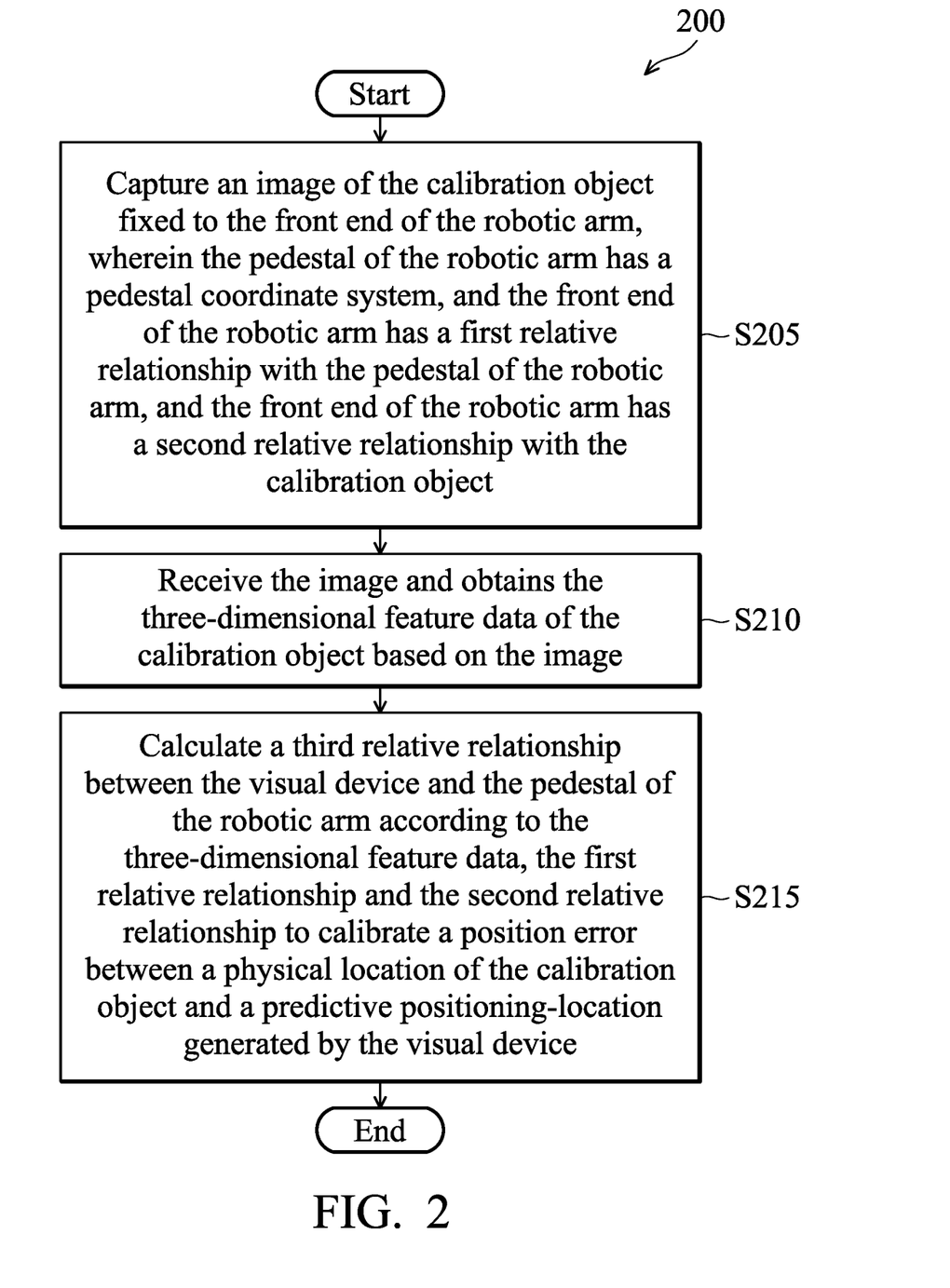
FIG. 2 is a flowchart illustrating a calibration method for a robotic arm system according to an embodiment of the present disclosure.

FIG. 2 is a flowchart illustrating a calibration method 200 for a robotic arm system according to an embodiment of the present disclosure. The method can be implemented in the robotic arm system 100 as shown in FIG. 1.

In step S205, the visual device 130 captures an image of the calibration object 110 fixed to the front end of the robotic arm 120, wherein the pedestal 150 of the robotic arm 120 has a pedestal coordinate system, and the front end of the robotic arm 120 has a first relative relationship with the pedestal 150 of the robotic arm 120, and the front end of the robotic arm 120 has a second relative relationship with the calibration object 110. In one embodiment, the calibration object 110 is a three-dimensional object that does not have any positioning marks.

Next, in step S210, the computing device 140 receives the image and obtains the three-dimensional feature data of the calibration object 110 based on the image. In step S215, the computing device 140 calculates a third relative relationship between the visual device 130 and the pedestal 150 of the robotic arm 120 according to the three-dimensional feature data, the first relative relationship and the second relative relationship to calibrate a position error between a physical location of the calibration object 110 and a predictive positioning-location generated by the visual device 130.

Figure 3:
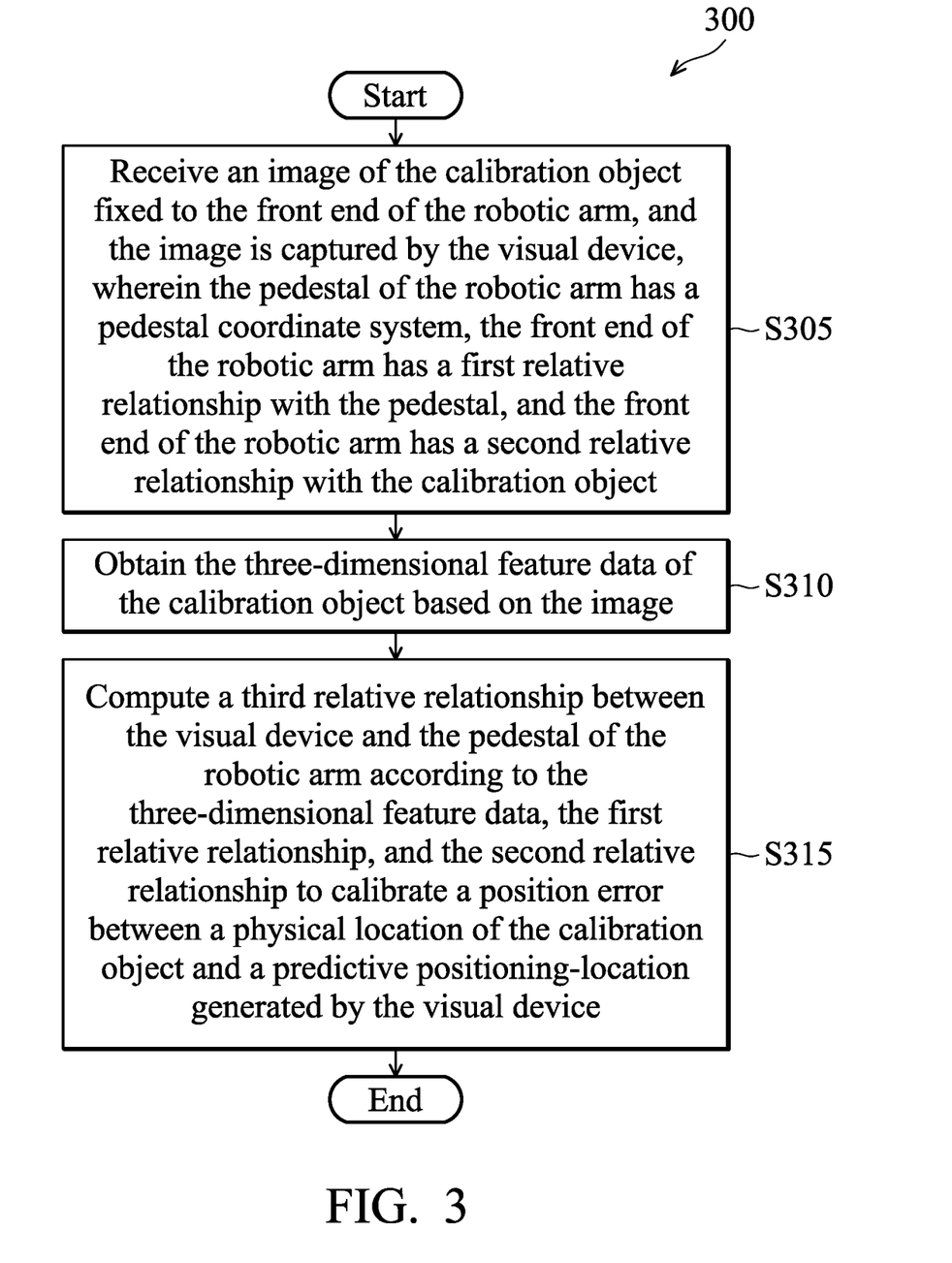
FIG. 3 is a flowchart illustrating a calibration method for the robotic arm system according to an embodiment of the present disclosure.

FIG. 3 is a flowchart illustrating a calibration method 300 for the robotic arm system 100 according to an embodiment of the present disclosure. The method can be implemented in the processor of the computing device 140 as shown in FIG. 1.

In step S305, the computing device 140 receives an image of the calibration object 110 fixed to the front end 122 of the robotic arm 120, and the image is captured by the visual device 130, wherein the pedestal 150 of the robotic arm 120 has a pedestal coordinate system, the front end 122 of the robotic arm 120 has a first relative relationship with the pedestal 150, and the front end 122 of the robotic arm 120 has a second relative relationship with the calibration object 110. Next, in step S310, the computing device 140 obtains the three-dimensional feature data of the calibration object 110 based on the image. In step S315, the computing device 140 computes a third relative relationship between the visual device 130 and the pedestal 150 of the robotic arm 120 according to the three-dimensional feature data, the first relative relationship, and the second relative relationship to calibrate a position error between a physical location of the calibration object 110 and a predictive positioning-location generated by the visual device 130.

It should be noted that in the calibration methods 200 and 300 of FIGS. 2 and 3, the front end 122 of the robotic arm 120 and the calibration object 110 are fixed. In other words, the front end 122 of the robotic arm 120 does not need to move the calibration object 110 for calibration. In addition, since the front end 122 of the robotic arm 120 and the calibration object 110 are fixed, the visual device 130 does not need to obtain the images of the calibration object 110 from a plurality of angles of view. The following describes in details how the computing device 140 obtains the three-dimensional feature data of the calibration object 110 according to the image in the steps S210 and S310.

Figure 4A:
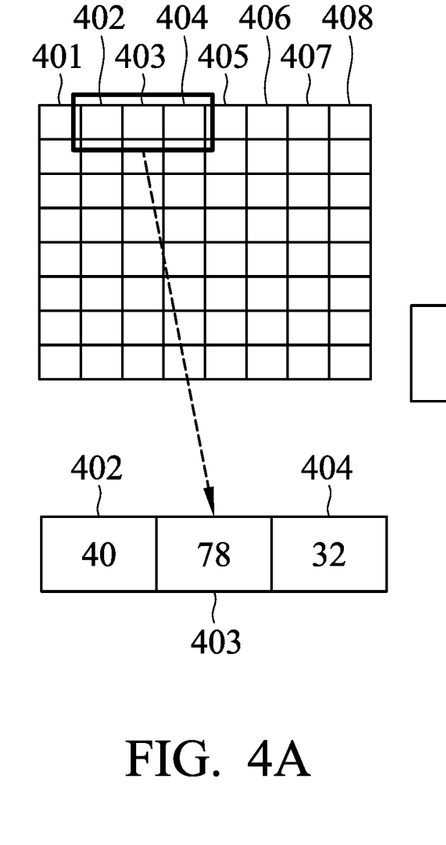
FIG. 4A is a schematic diagram illustrating an image composed of point cloud primitives according to an embodiment of the present disclosure.

First, the computing device 140 obtains point cloud information of the calibration object 110 in the image according to the image. Next, the computing device 140 compares a depth value of each point cloud primitive with depth values of the left and right point cloud primitives. When the first depth value of the first point cloud primitive is greater than the second depth values of the second point cloud primitives on the left and right sides and a value difference between the first depth value and one of the second depth values is greater than a first threshold value, the computing device 140 sets the first point cloud primitive as a target point. For example, FIG. 4A is a schematic diagram illustrating an image composed of point cloud primitives according to an embodiment of the present disclosure. The depth value of the point cloud primitive 402 is 40 mm, the depth value of the point cloud primitive 403 is 78 mm, and the depth value of the point cloud primitive 404 is 32 mm. Taking the point cloud primitive 403 as an example, the computing device 140 compares the depth value of the point cloud primitive 403 with the depth values of the left and right point cloud primitives 402 and 404. When the depth value of the point cloud primitive 403 is greater than the depth values of the left and right point cloud primitives 402 and 404 and the depth value of the point cloud primitive 403 is a first threshold value (for example, 10 mm) greater than one of the depth values of the point cloud primitives 402 and 404, the computing device 140 sets the point cloud primitive 403 set as a target point.

Figure 4B:
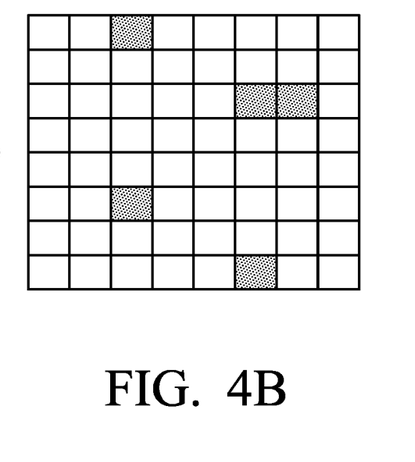
FIG. 4B is a schematic diagram illustrating the target points in the image according to an embodiment of the present disclosure.

After the computing device 140 compares the depth values of all point cloud primitives in the image with the depth values of the point cloud primitives at the respective left and right sides, the computing device 140 may obtain all target points in the image. As shown in FIG. 4B, the gray squares are the target points.

In another embodiment, the computing device 140 may not need to compare the depth value of each point cloud primitive with the depth value of the point cloud primitives at the respective left and right sides. The computing device 140 may perform a comparison procedure every predetermined amount of point cloud primitives. For example, as shown in FIG. 4A, it is assumed that the predetermined amount is 2. After the computing device 140 performs the comparison procedure on the point cloud primitive 403, the comparison procedure is not performed on the point cloud primitives 404 and 405, and the comparison procedure is directly performed on the point cloud primitive 406. It should be noted that the more the predetermined amount is, the faster the computing device 140 captures the feature data, but the recognition rate of the feature data will decrease. Therefore, the user can adjust the predetermined amount according to the operational requirements.

Next, the computing device 140 divides the point cloud information into a plurality of groups according to the target points, wherein each group is plane information. Specifically, the computing device 140 compares a target depth value for each target point with the depth values of the point cloud primitives around the target point. When the absolute value of the difference between the first target depth value of a first target point and the third depth value of a third point cloud primitive of the point cloud primitives around the first target point is less than a second threshold value, the computing device 140 determines that the third point cloud primitive belongs in the same group as the first target point. In an embodiment, the first threshold value is greater than the second threshold value.

Figure 5A:
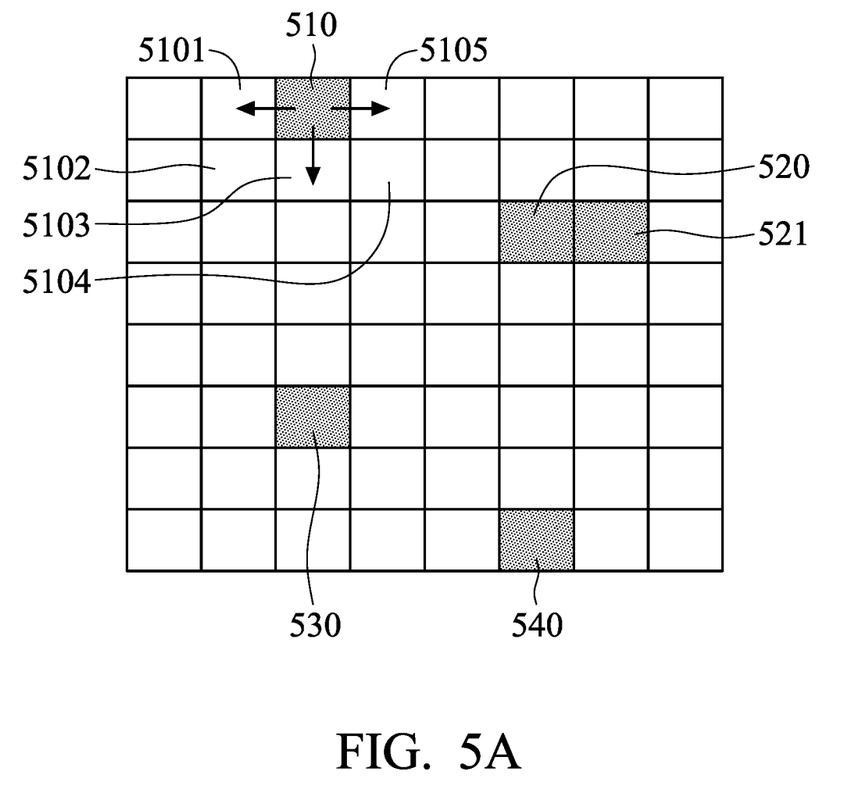
FIG. 5A is a schematic diagram illustrating all target points in the image obtained by the computing device according to an embodiment of the present disclosure.

FIG. 5A is a schematic diagram illustrating all target points in the image obtained by the computing device 140 according to an embodiment of the present disclosure. There are target points 510, 520, 521, 530 and 540 in FIG. 5A. Taking the target point 510 as an example, the computing device 140 compares the target depth value of the target point 510 with the depth values of the point cloud primitives 5101, 5102, 5103, 5104, 5105 around the target point 510. When the absolute value of the difference between the target depth value of the target point 510 and each of the depth values of the point cloud primitives 5101, 5102 and 5103 is less than the second threshold value (for example, 5 mm), the computing device 140 determines that the point cloud primitives 5101, 5102 and 5103 belong to the same group as the target point 510.

Figure 5B:
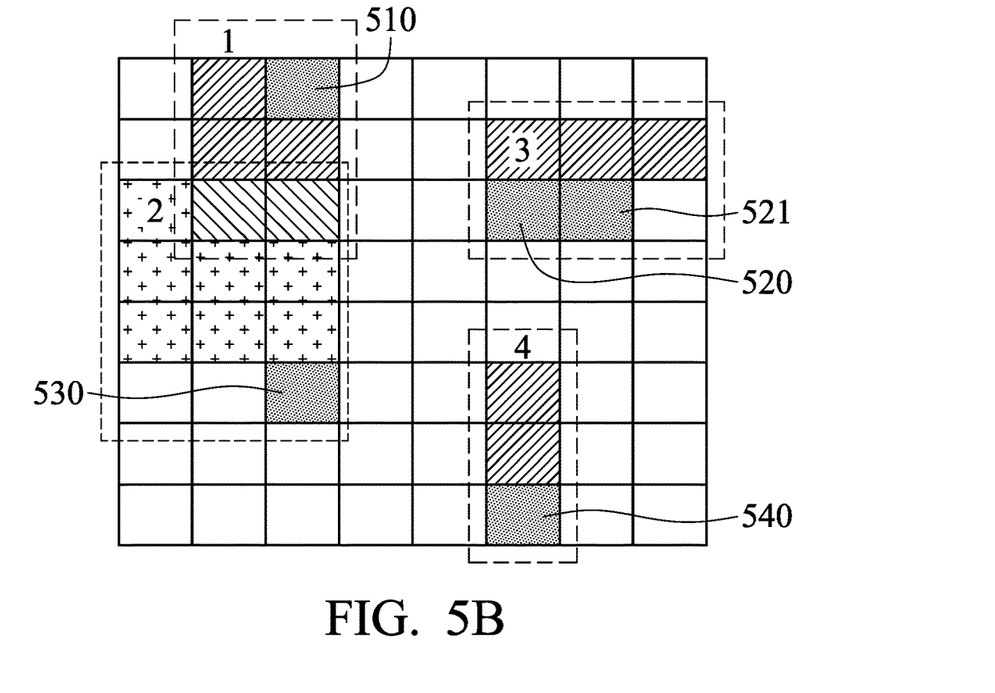
FIG. 5B is a schematic diagram illustrating the point cloud information divided into a plurality of groups by the computing device according to an embodiment of the present disclosure.

The computing device 140 then determines whether the absolute value of the difference between the depth value of each of the point cloud primitives 5101, 5102 and 5103 and the depth values of each of the point cloud primitives around each of the point cloud primitives 5101, 5102 and 5103 is less than the second threshold value. When the absolute value of the difference between the depth value of each of the point cloud primitives 5101, 5102 and 5103 and the depth values of each of the point cloud primitives around each of the point cloud primitives 5101, 5102 and 5103 is less than the second threshold value, the computing device 140 determines that the point cloud primitives around the point cloud primitives 5101, 5102 and 5103 belong to the same group as the point cloud primitives 5101, 5102 and 5103. And so on, the computing device 140 divides the point cloud information into a plurality of groups. The grouping results are as shown in FIG. 5B, and each group is represented by a dashed box.

In the grouping process, some groups may be combined. As shown in FIG. 5B, the target points 520 and 521 are divided into the same group by the computing device 140 during the grouping process. In addition, the groups are the real plane information in the three-dimensional space.

Figure 5C:
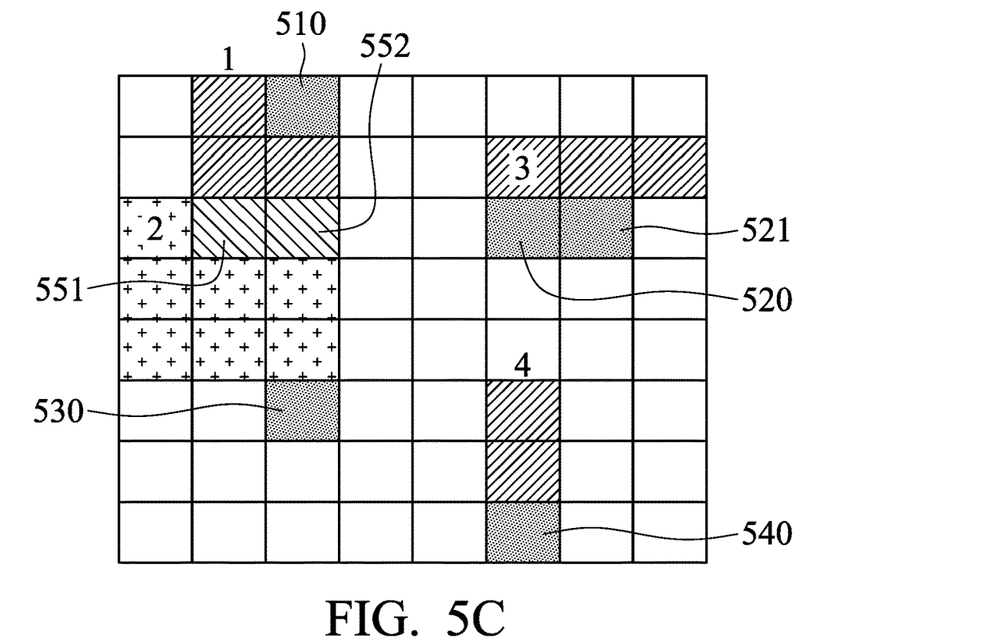
FIG. 5C is a schematic diagram illustrating the planes according to an embodiment of the present disclosure.

The computing device 140 calculates the boundary feature data using the plane information, wherein the boundary feature data can be regarded as a boundary generated by the intersection of any two of the planes. The method used by the computing device 140 for determining the boundary is to test whether there are intersecting regions in any two of the planes. As shown in FIG. 5C, there are four groups representing four planes in the image, wherein there are overlapping regions (the regions 551 and 552) in the plane 1 and the plane 2. The computing device 140 determines that the overlapping region is a boundary and records that the boundary is generated by the plane 1 and the plane 2. Accordingly, the computing device 140 establishes the boundary feature data as shown in TABLE 1.

TABLE 1

An area and a position standard deviation of each intersecting plane
A normal vector of each intersecting plane
Angles at which any two of the planes intersect
A length of a line of intersection of any two of the planes
A three-dimensional position of a starting point and a three-dimensional position of an end point of the intersection of any two of the planes After the computing device 140 determines the boundaries, the computing device 140 finds out the intersections of any three planes according to the boundary feature data. In real space, the corner points of a three-dimensional object must be formed by at least three intersecting planes. Therefore, the computing device 140 calculates whether there is a region formed by any three intersecting planes according to the plane information and the boundary feature data. When the computing device 140 determines that there is a region formed by any three intersecting planes, the computing device 140 sets the region as a corner region. The computing device 140 locates the corner position in the real space according to the corner region, and establishes the plane feature data according to the corner position, as shown in TABLE 2.

TABLE 2

An area and a position standard deviation of each intersecting plane
A normal vector of each intersecting plane
An angle at which any two of the planes in three planes intersect
A length of a line of intersection of any two of the planes in the three planes
A three-dimensional position of a starting point and a three-dimensional position of an end point of a line of the intersection of any two of the planes in the three planes
A three-dimensional position of the point where the three planes intersect Next, the computing device 140 obtains the three-dimensional feature data of the calibration object 110 according to the boundary feature data and the plane feature data. In other words, no matter how many planes the calibration object 110 have, the computing device 140 can obtain the three-dimensional feature data of the calibration object 110 by using the boundary feature data and the plane feature data in TABLE 1 and TABLE 2, as shown in TABLE 3.

TABLE 3

All planes

Positions of points, an area and a position standard deviation of each plane
Normal vectors
Any two intersecting planes An area and a position standard deviation of each intersecting plane
A normal vector of each intersecting plane
Angles at which any two of the planes intersect
A length of a line of intersection of any two of the planes
A three-dimensional position of a starting point and a three-dimensional position of an end point of the intersection of any two of the planes
Any three intersecting planes An area and a position standard deviation of each intersecting plane
A normal vector of each intersecting plane
Angles at which any two of the planes intersect
A length of a line of intersection of any two of the planes
A three-dimensional position of a starting point and a three-dimensional position of an end point of a line of the intersection of any two of the planes
A three-dimensional position of the point where the three planes intersect After the computing device 140 obtains the three-dimensional feature data, the computing device 140 may compute a third relative relationship between the visual device 130 and the pedestal 150 of the robotic arm 120 according to the three-dimensional feature data, the first relative relationship, and the second relative relationship. The following describes in details how the computing device 140 obtains the third relative relationship in the steps S215 and S315.

A three-dimensional space equation formed by the three-dimensional feature data, the first relative relationship, the second relative relationship, and the third relative relationship is expressed as follows:

$$AZ=BX$$

wherein A represents the three-dimensional feature data, B represents the first relative relationship, X represents the second relative relationship and Z represents the third relative relationship. In an embodiment, the third relative relationship Z comprises a displacement relationship and a rotation relationship, and the third relative relationship Z may be represented by a matrix, a spherical coordinate system, or other forms.

In the present disclosure, the length, width and height of the calibration object 110, the first relative relationship B between the front end 122 of the robotic arm 120 and the pedestal 150, and the second relative relationship X between the front end 122 of the robotic arm 120 and the calibration object 110 can be regarded as known parameters. The three-dimensional feature data A can be obtained from the image through the computing device 140. Thus, the third relative relationship Z between the visual device 130 and the pedestal 150 of the robotic arm 120 can be calculated by the computing device 140 using an optimization equation, wherein the optimization equation is expressed as follows $$Z = \min(\alpha N_d(\Sigma \text{Dis}_{corner}) + \beta N_a(\Sigma \text{Arg}_{normal}) + \gamma N_p(\Sigma \text{Plane}_{diff}))$$

wherein α, β and γ are weight values, $N_d$ is the normalized distance between vertices of the calibration object, $N_a$ is the normalized angle between the planes of the calibration object, $N_p$ is the normalized plane intensity between the planes of the calibration object, $\text{Dis}_{corner}$ is the distance between any two of the vertices of the calibration object, $\text{Arg}_{normal}$ is an angle difference between normal vectors of the planes of the calibration object, and $\text{Plane}_{diff}$ is the degree of planarization of the calibration object.

Figure 6A:
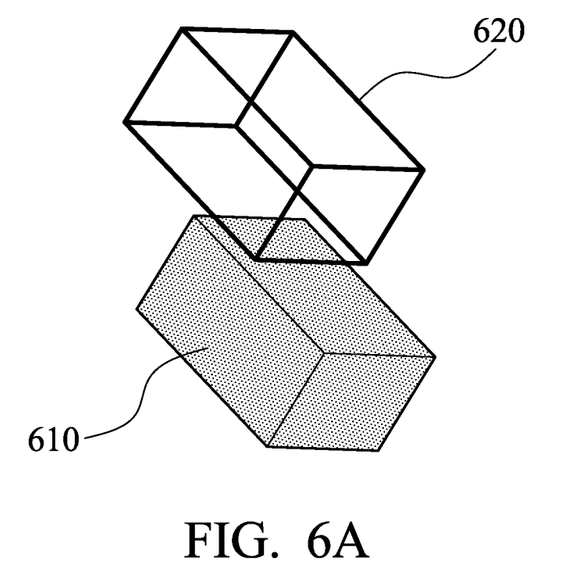
FIGS. 6A-6B are schematic diagrams illustrating that the position error between the physical location of the calibration object and the predictive positioning-location generated by the visual device is calibrated by the computing device according to an embodiment of the present disclosure.
Figure 6B:
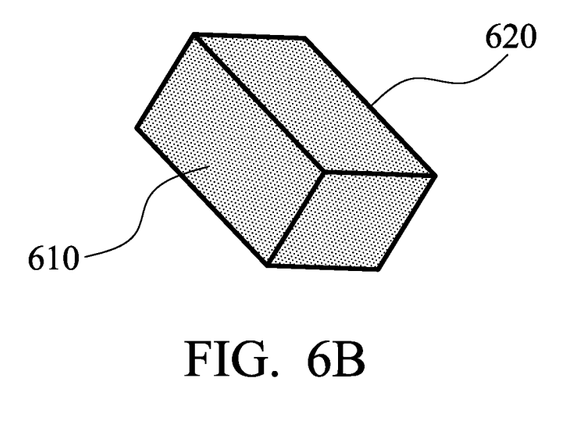

Finally, the computing device 140 calibrates the position error between the physical location of the calibration object 110 and the predictive positioning-location generated by the visual device 130 according to the third relative relationship Z. FIGS. 6A-6B are schematic diagrams illustrating that the position error between the physical location of the calibration object 110 and the predictive positioning-location generated by the visual device 130 is calibrated by the computing device 140 according to an embodiment of the present disclosure. As shown in FIG. 6A, the object 610 is the three-dimensional feature data A of the calibration object 110 obtained by the computing device 140 according to the image, and the object 620 is a relative relationship between the pedestal 150 of the robotic arm 120 and the calibration object 110 (i.e., the first relative relationship B is multiplied by the second relative relationship X). The computing device 140 uses the optimization operation to obtain the third relative relationship Z such that the object 610 and the object 620 are overlapped to complete the calibration of the position error between the physical location of the calibration object 110 and the predictive positioning-location generated by the visual device 130, as shown in FIG. 6B.

As described above, the calibration method and device for the robotic arm system 100 of the present disclosure do not need to know the position where the visual device 130 is mounted, and also do not need to move the robotic arm 120, and directly obtain the relative relationship between the visual device 130 and the pedestal 150 of the robotic arm 120 by using the optimization operation to achieve the purpose of effectively improving the calibration efficiency and accuracy.

Figure 7:
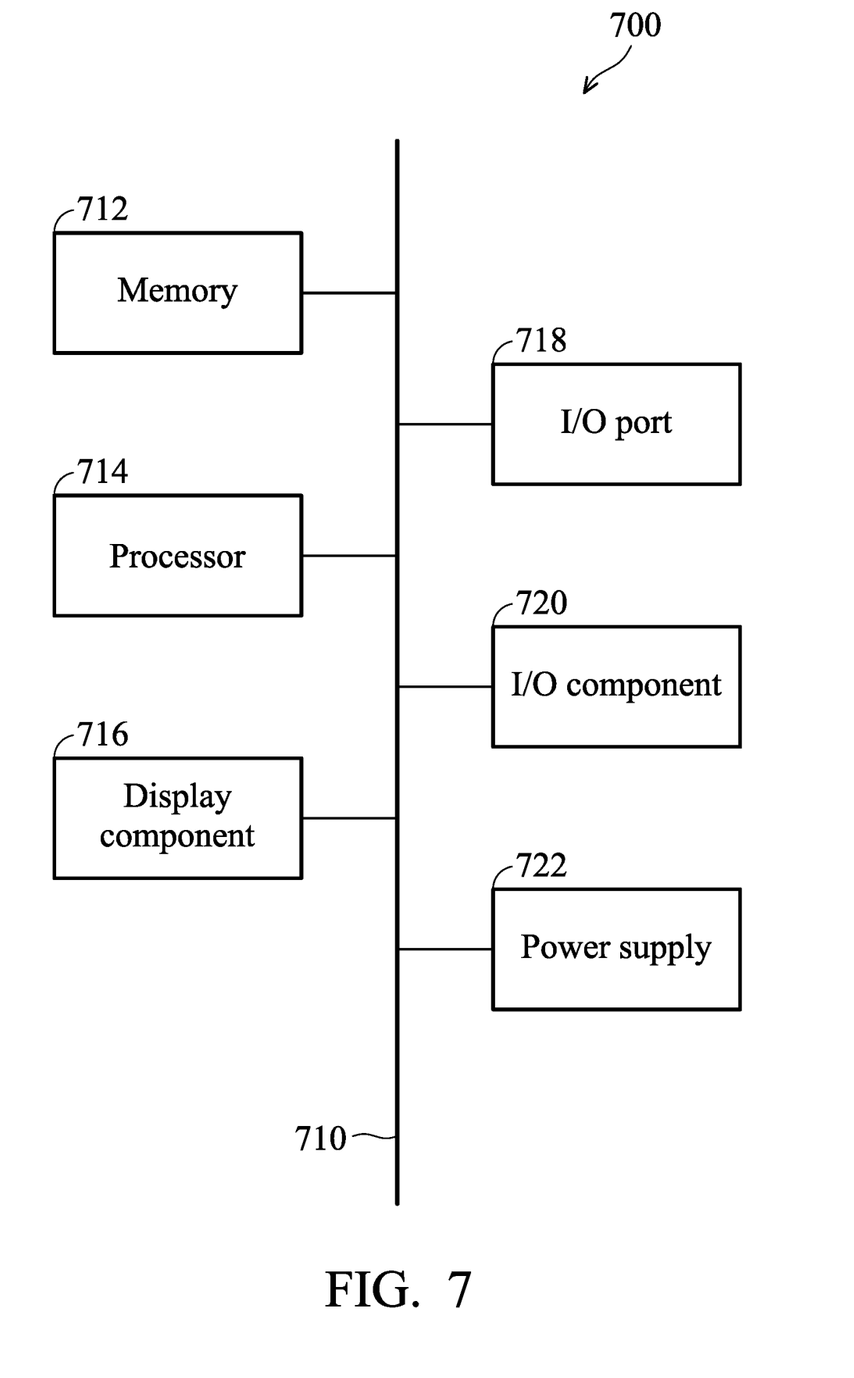
FIG. 7 illustrates an exemplary operating environment for implementing embodiments of the present disclosure.

Having described embodiments of the present disclosure, an exemplary operating environment in which embodiments of the present disclosure may be implemented is described below. Referring to FIG. 7, an exemplary operating environment for implementing embodiments of the present disclosure is shown and generally known as a computing device 700. The computing device 700 is merely an example of a suitable computing environment and is not intended to limit the scope of use or functionality of the disclosure. Neither should the computing device 700 be interpreted as having any dependency or requirement relating to any one or combination of components illustrated.

The disclosure may be realized by means of the computer code or machine-useable instructions, including computer-executable instructions such as program modules, being executed by a computer or other machine, such as a personal data assistant (PDA) or other handheld device. Generally, program modules may include routines, programs, objects, components, data structures, etc., and refer to code that performs particular tasks or implements particular abstract data types. The disclosure may be implemented in a variety of system configurations, including hand-held devices, consumer electronics, general-purpose computers, more specialty computing devices, etc. The disclosure may also be implemented in distributed computing environments where tasks are performed by remote-processing devices that are linked by a communication network.

With reference to FIG. 7, the computing device 700 may include a bus 710 that is directly or indirectly coupled to the following devices: one or more memories 712, one or more processors 714, one or more display components 716, one or more input/output (I/O) ports 718, one or more input/output (I/O) components 720, and an illustrative power supply 722. The bus 710 may represent one or more kinds of busses (such as an address bus, data bus, or any combination thereof). Although the various blocks of FIG. 7 are shown with lines for the sake of clarity, and in reality, the boundaries of the various components are not specific. For example, the display component such as a display device may be considered an I/O component and the processor may include a memory.

The computing device 700 typically includes a variety of computer-readable media. The computer-readable media can be any available media that can be accessed by computing device 700 and includes both volatile and nonvolatile media, removable and non-removable media. By way of example, but not limitation, computer-readable media may comprise computer storage media and communication media. The computer storage media may include volatile and nonvolatile, removable and non-removable media implemented in any method or technology for storage of information such as computer-readable instructions, data structures, program modules or other data. The computer storage media may include, but not limit to, random access memory (RAM), read-only memory (ROM), electrically-erasable programmable read-only memory (EEPROM), flash memory or other memory technology, compact disc read-only memory (CD-ROM), digital versatile disks (DVD) or other optical disk storage, magnetic cassettes, magnetic tape, magnetic disk storage or other magnetic storage devices, or any other medium which can be used to store the desired information and which can be accessed by the computing device 700. The computer storage media may not comprise signal per se.

The communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, but not limitation, communication media includes wired media such as a wired network or direct-wired connection, and wireless media such as acoustic, RF, infrared and other wireless media or any combination thereof.

The memory 712 may include computer-storage media in the form of volatile and/or nonvolatile memory. The memory may be removable, non-removable, or a combination thereof. Exemplary hardware devices include solid-state memory, hard drives, optical-disc drives, etc. The computing device 700 includes one or more processors that read data from various entities such as the memory 712 or the I/O components 720. The display component(s) 716 present data indications to a user or other device. Exemplary display components include a display device, speaker, printing component, vibrating component, etc.

The I/O ports 718 allow the computing device 700 to be logically coupled to other devices including the I/O components 720, some of which may be embedded. Illustrative components include a microphone, joystick, game pad, satellite dish, scanner, printer, wireless device, etc. The I/O components 720 may provide a natural user interface (NUI) that processes gestures, voice, or other physiological inputs generated by a user. For example, inputs may be transmitted to an appropriate network element for further processing. A NUI may be implemented to realize speech recognition, touch and stylus recognition, face recognition, biometric recognition, gesture recognition both on screen and adjacent to the screen, air gestures, head and eye tracking, touch recognition associated with displays on the computing device 700, or any combination of. The computing device 700 may be equipped with depth cameras, such as stereoscopic camera systems, infrared camera systems, RGB camera systems, any combination of thereof to realize gesture detection and recognition. Furthermore, the computing device 700 may be equipped with accelerometers or gyroscopes that enable detection of motion. The output of the accelerometers or gyroscopes may be provided to the display of the computing device 700 to carry out immersive augmented reality or virtual reality.

Furthermore, the processor 714 in the computing device 700 can execute the program code in the memory 712 to perform the above-described actions and steps or other descriptions herein.

It should be understood that any specific order or hierarchy of steps in any disclosed process is an example of a sample approach. Based upon design preferences, it should be understood that the specific order or hierarchy of steps in the processes may be rearranged while remaining within the scope of the present disclosure. The accompanying method claims present elements of the various steps in a sample order, and are not meant to be limited to the specific order or hierarchy presented.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

While the disclosure has been described by way of example and in terms of the preferred embodiments, it should be understood that the disclosure is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A calibration method for a robotic arm system, wherein the robotic arm system comprises a robotic arm, a calibration object, a visual device and a computing device, the method comprising:

capturing, by the visual device, an image of the calibration object fixed to a front end of the robotic arm, wherein a pedestal of the robotic arm has a pedestal coordinate system, and the front end of the robotic arm has a first relative relationship with the pedestal, the front end of the robotic arm has a second relative relationship with the calibration object;

receiving, by the computing device, the image, and obtaining three-dimensional feature data of the calibration object according to the image; and computing, by the computing device, a third relative relationship between the visual device and the pedestal of the robotic arm according to the three-dimensional feature data, the first relative relationship, and the second relative relationship to calibrate a position error between a physical location of the calibration object and a predictive positioning-location generated by the visual device, wherein the calibration object is a three-dimensional object that does not have any positioning marks.

2. The calibration method for a robotic arm system as claimed in claim 1, wherein the step of obtaining the three-dimensional feature data of the calibration object according to the image by the computing device further comprises:

obtaining point cloud information of the calibration object in the image;

comparing a depth value of each point cloud primitive with depth values of the left and right point cloud primitives;

when a first depth value of a first point cloud primitive is greater than second depth values of second point cloud primitives on the left and right sides and a value difference between the first depth value and one of the second depth values is greater than a first threshold value, setting the first point cloud primitive as a target point;

dividing the point cloud information into a plurality of groups according to the target points, wherein each group is plane information;

obtaining boundary feature data and plane feature data according to the plane information; and obtaining the three-dimensional feature data of the calibration object according to the boundary feature data and the plane feature data.

3. The calibration method for a robotic arm system as claimed in claim 2, wherein the step of dividing the point cloud information into a plurality of groups according to the target points by the computing device further comprises:

comparing a target depth value of each target point with depth values of point cloud primitives around the target point; and when the absolute value of a difference between a first target depth value of a first target point and a third depth value of a third point cloud primitive of the point cloud primitives around the first target point is less than a second threshold value, determining that the third point cloud primitive belongs in the same group as the first target point.

4. The calibration method for a robotic arm system as claimed in claim 3, wherein the first threshold value is greater than the second threshold value.

5. The calibration method for a robotic arm system as claimed in claim 1, wherein the three-dimensional feature data at least comprises:

positions of points, an area and a position standard deviation of each plane;

a normal vector of each plane;
angles at which any two of the planes intersect;
a length of a line of intersection of any two of the planes;
a three-dimensional position of a starting point and a three-dimensional position of an end point of the intersection of any two of the planes; and
a three-dimensional position of the intersection of any three of the planes.

6. The calibration method for a robotic arm system as claimed in claim 1, wherein the computing device further obtains the third relative relationship by using an optimization equation, and the optimization equation is expressed as follows:

$$Z=\min(\alpha N_d(\Sigma \text{Dis}_{corner})+\beta N_a(\Sigma \text{ Arg}_{normal})+\gamma N_p (\Sigma \text{Plane}_{diff}))$$

wherein $\alpha$, $\beta$ and $\gamma$ are weight values, $N_d$ is a normalized distance between vertices of the calibration object, $N_a$ is the normalized angle between the planes of the calibration object, $N_p$ is a normalized plane intensity between the planes of the calibration object, $\text{Dis}_{corner}$ is a distance between any two of the vertices of the calibration object, $\text{Arg}_{normal}$ is an angle difference between normal vectors of the planes of the calibration object, and $\text{Plane}_{diff}$ is a degree of planarization of the calibration object.

7. A robotic arm system, comprising:
a calibration object, wherein the calibration object is a three-dimensional object that does not have any positioning marks;
a robotic arm, wherein the calibration object is fixed to a front end of the robotic arm;
a visual device, capturing an image of the calibration object; and
a computing device, coupled to the robotic arm and the visual device;
wherein a pedestal of the robotic arm has a pedestal coordinate system, and the front end of the robotic arm has a first relative relationship with the pedestal, the front end of the robotic arm has a second relative relationship with the calibration object; the computing device receives the image from the visual device and obtains three-dimensional feature data of the calibration object according to the image; and the computing device computes a third relative relationship between the visual device and the pedestal of the robotic arm according to the three-dimensional feature data, the first relative relationship, and the second relative relationship to calibrate a position error between a physical location of the calibration object and a predictive positioning-location generated by the visual device.

8. The robotic arm system as claimed in claim 7, wherein the three-dimensional feature data of the calibration object is obtained according to the image by:
obtaining point cloud information of the calibration object in the image;
comparing a depth value of each point cloud primitive with depth values of the left and right point cloud primitives;
when a first depth value of a first point cloud primitive is greater than second depth values of second point cloud primitives on the left and right sides and a value difference between the first depth value and one of the second depth values is greater than a first threshold value, setting the first point cloud primitive as a target point;
dividing the point cloud information into a plurality of groups according to the target points, wherein each group is plane information;
obtaining boundary feature data and plane feature data according to the plane information; and
obtaining the three-dimensional feature data of the calibration object according to the boundary feature data and the plane feature data.

9. The robotic arm system as claimed in claim 8, wherein the point cloud information is divided into a plurality of groups according to the target points by:
comparing a target depth value of each target point with depth values of point cloud primitives around the target point; and
when the absolute value of a difference between a first target depth value of a first target point and a third depth value of a third point cloud primitive of the point cloud primitives around the first target point is less than a second threshold value, determining that the third point cloud primitive belongs in the same group as the first target point.

10. The robotic arm system as claimed in claim 9, wherein the first threshold value is greater than the second threshold value.

11. The robotic arm system as claimed in claim 7, wherein the three-dimensional feature data at least comprises:
positions of points, an area and a position standard deviation of each plane;
a normal vector of each plane;
angles at which any two of the planes intersect;
a length of a line of intersection of any two of the planes;
a three-dimensional position of a starting point and a three-dimensional position of an end point of the intersection of any two of the planes; and
a three-dimensional position of the intersection of any three of the planes.

12. The robotic arm system as claimed in claim 7, wherein the computing device further obtains the third relative relationship by using an optimization equation, and the optimization equation is expressed as follows:

$$Z=\min(\alpha N_d(\Sigma \text{Dis}_{corner})+\beta N_a(\Sigma \text{ Arg}_{normal})+\gamma N_p (\Sigma \text{Plane}_{diff}))$$

wherein $\alpha$, $\beta$ and $\gamma$ are weight values, $N_d$ is a normalized distance between vertices of the calibration object, $N_a$ is the normalized angle between the planes of the calibration object, $N_p$ is a normalized plane intensity between the planes of the calibration object, $\text{Dis}_{corner}$ is a distance between any two of the vertices of the calibration object, $\text{Arg}_{normal}$ is an angle difference between normal vectors of the planes of the calibration object, and $\text{Plane}_{diff}$ is a degree of planarization of the calibration object.

* * * * *